(12) United States Patent
Kim

(10) Patent No.: US 7,009,676 B1
(45) Date of Patent: Mar. 7, 2006

(54) STRUCTURE OF A PAD IN A LIQUID CRYSTAL DISPLAY DEVICE AND A METHOD FOR MANUFACTURING THEREOF

(75) Inventor: Jeom Jae Kim, Seoul (KR)

(73) Assignee: LG LCD Inc., Seoul (KR)

( * ) Notice: Subject to any disclaimer, the term of this patent is extended or adjusted under 35 U.S.C. 154(b) by 0 days.

(21) Appl. No.: 09/317,719

(22) Filed: May 24, 1999

(30) Foreign Application Priority Data

May 25, 1998 (KR) .................................. P98-18883

(51) Int. Cl.
G02F 1/1333 (2006.01)
G02F 1/1345 (2006.01)

(52) U.S. Cl. ...................... 349/158; 349/149

(58) Field of Classification Search ................. 349/42, 349/158, 187, 149, 152

See application file for complete search history.

(56) References Cited

U.S. PATENT DOCUMENTS

| 5,434,433 | A | * | 7/1995 | Takasu et al. | ............... 257/59 |
| 5,766,493 | A | * | 6/1998 | Shin | ............... 216/23 |
| 5,805,246 | A | * | 9/1998 | Lee et al. | ............... 349/40 |
| 5,822,030 | A | * | 10/1998 | Uchiyama | ............... 349/149 |
| 6,236,446 | B1 | * | 5/2001 | Izumi et al. | ............... 349/187 |
| 6,630,686 | B1 | * | 10/2003 | Kim | ............... 257/72 |

FOREIGN PATENT DOCUMENTS

| JP | 59-111868 | * | 6/1984 |
| JP | 8-194212 A | | 7/1996 |
| JP | 9-90399 A | | 4/1997 |

* cited by examiner

*Primary Examiner*—Dung T. Nguyen
(74) *Attorney, Agent, or Firm*—Birch,Stewart,Kolasch & Birch,LLP

(57) ABSTRACT

An LCD is constructed such that a side edge of a common electrode disposed on an entire surface of an upper substrate and a pad disposed on the lower substrate facing the upper substrate are not overlapped. The LCD includes an active panel having a gate pad and a source pad spaced at a predetermined distance D from the edge of the color filter panel which faces the active panel.

52 Claims, 4 Drawing Sheets

STRUCTURE OF A PAD IN A LIQUID CRYSTAL DISPLAY DEVICE AND A METHOD FOR MANUFACTURING THEREOF

BACKGROUND OF THE INVENTION

1. Field of the Invention

The present invention relates to a structure of a liquid crystal display device (LCD) and a manufacturing method thereof. More specifically, the present invention relates to a structure of an LCD in which a side edge of a common electrode disposed on the entire surface of an upper substrate and a pad disposed on the lower substrate facing the upper substrate are not overlapped, and the present invention also relates to a method of manufacturing such an LCD.

2. Description of the Background Art

The CRT (Cathode Ray Tube), a widely used display device, is being replaced by the thin flat panel display device because the thin flat panel display device is thinner and lighter than the CRT so it can be located any place. Research has been focused on the development of liquid crystal display devices because of their high resolution and fast response time which is suitable for displaying motion picture images. Furthermore, the active panel including an active switching element such as a thin film transistor (TFT) is being applied to the LCD much more frequently and easily.

A liquid crystal display device works by using polarization and optical anisotrophy of a liquid crystal material. By controlling the orientation of rod-shaped liquid crystal molecules through a polarization technique, transmission and interception of a light through the liquid crystal are achieved because of the anisotrophy of the liquid crystal material. This principle is used in the liquid crystal display device. Active matrix liquid crystal displays (AMLCDs) having TFTs arranged in a matrix pattern and pixel electrodes connected to the TFTs provide high quality images are widely used.

The structure of a conventional AMLCD will now be described referring to FIG. 1 which shows the perspective view of the conventional AMLCD and FIG. 2 which shows a cross-sectional view of the conventional AMLCD cut along line II—II in FIG. 1.

Generally, a liquid crystal display device includes two panels 3 and 5 each having several elements and arranged to face each other with a liquid crystal material 10 located between the two panels 3, 5. The first panel, a color filter panel 3, includes a sequential arrangement of red, blue and green color filters 7 on a first transparent substrate 1*a* at pixel positions arranged in a matrix pattern. Among these color filters 7, black matrixes 9 are arranged in a lattice pattern. The black matrixes 9 prevent mixing of adjacent colors. A common electrode 8 is located on the color filters 7. The common electrode 8 is one electrode forming the electric field for driving the liquid crystal material 10.

The second panel, an active panel 5, includes pixel electrodes 47 arranged in a matrix pattern and formed on a second transparent substrate 1*b*. The pixel electrode 47 is the other electrode forming the electric field for driving the liquid crystal material 10. Scan bus lines 13 are arranged along the column direction of the pixel electrodes 47 and data bus lines 23 are arranged along the row direction of the pixel electrodes 47. At a corner of a pixel electrode 47, a TFT for driving the pixel electrode 47 is formed. A gate electrode 11 of the TFT is connected to a scan bus line 13 which is also referred to as a gate line. A source electrode 21 of the TFT is connected with a data bus line 23 which is also referred to as a source line. A drain electrode 31 of the TFT is connected to the pixel electrode 47. A semiconductor layer 33 is disposed between the source electrode 21 and the drain electrode 31. The source electrode 21 and the semiconductor layer 33 and the drain electrode 31 and the semiconductor layer 33 are ohmic contacted, respectively. Additionally, a gate pad 15 is formed at the end portion of each gate line 13 and a source pad 25 is formed at the end portion of each source line 23. A gate pad terminal 57 and a data pad terminal 67 are formed on the gate pad 15 and the source pad 25, respectively. Each of the pad terminals 57 and 67 contact the voltage supplying layer (not shown) and is supplied with the signal and data voltage respectively, from the driving IC.

As a signal voltage applied to the gate pad 15 via the gate pad terminal 57 is applied to the gate electrode 11 through the gate line 13, the TFT of the corresponding gate electrode 11 is in an ON state. Then the source electrode 21 and the drain electrode 31 of the TFT 19 are electrically connected so that the electrical picture data applied to the source pad 25 is sent to the drain electrodes 27 through the source line 23 and the source electrode 21. Otherwise, no signal voltage is applied to the gate pad 15, then the source electrode 21 and the drain electrode 31 of the TFT are electrically isolated. Therefore, controlling the signal voltage of the gate electrode 11 determines whether the picture data is applied to the drain electrode or not. That is, the TFT 19 acts as a switching element. A gate insulating layer 17 is inserted between the layer including the gate electrode 13 and the layer including the source electrode 23 to isolate them electrically. A passivation layer 37 is formed on the layer including the source line 23 to protect all of the elements of the LCD.

The color filter panel 3 and the active panel 5 are bonded together so as to face each other and so as to be spaced apart by a certain distance which is referred to as a cell gap. Liquid crystal material 10 fills the cell gap and the edges of the bonded panels are sealed with a sealant 81 such as an epoxy to prevent the liquid crystal material 10 from leaking. After the liquid crystal material 10 is injected between the color filter panel 3 and the active panel 5 which is joined together by the sealant 81, portions of the color filter panel 3 covering the gate pad 15 and the source pad 25 are removed in order to expose the pads 15 and 25 for connection to outputs of the driver IC so that a liquid crystal panel of an AMLCD is completed, as shown in FIGS. 1 and 2.

The disadvantage of the conventional LCD panel mentioned above will now be described referring to FIG. 3 which shows how a pad portion is shorted to the common electrode by a remaining conductive material. During the cutting process, a portion of the pad terminals 57 and 67 are essentially overlapped with the cutting edge of the color filter panel 3. By this mechanical cutting, therefore, conductive materials 77 such as Indium Tin Oxide (ITO) of the common electrode 8 which is formed on the entire surface of the upper panel 3 are left over or remain between the conductive common electrode 8 and the conductive pad terminal 57, as shown in FIG. 3. In this case, the gate pad terminal 57 of the lower panel 5 is electrically connected to the common electrode 8 of the upper panel 3 via the remaining conductive material 77. As a result, there are disadvantages that the conventional LCD panel is often shorted out because of the remaining conductive material 77 connected the gate pad terminal 57 and the common electrode 8. In this case, the LCD does not work properly.

SUMMARY OF THE INVENTION

To overcome the problems described above, preferred embodiments of the present invention provide a liquid crystal display device which has a structure which prevents conductive material from being located between the common electrode and the pads and includes a pad structure which prevents a short between panels caused by a conductive residue remaining after cutting the upper panel, and a method for manufacturing an LCD in which pad covering portions of a color filter panel are fully removed so that any remaining portion of the conductive material does not electrically connect the common electrode and the pads.

Other preferred embodiments of the present invention provide a liquid crystal display device which has a structure as described in the preceding paragraph but also includes a cut protection member made of ITO and provided on a passivation layer for protecting the passivation layer and the LCD during a cutting process of the LCD.

According to one preferred embodiment of the present invention, an LCD includes an active panel having a gate pad and a source pad which are arranged so as to be spaced in a horizontal direction a predetermined distance D from an edge of the color filter panel, which is arranged to face the active panel.

According to another preferred embodiment of the present invention, a method of manufacturing an LCD includes the steps of forming a first panel having a common electrode extending along an entire surface of the first panel, forming a second panel having a gate pad and a source pad, joining the first panel and the second panel together and inserting a liquid crystal material therebetween and cutting a portion of the first panel wherein the cut portion is arranged to cover the gate pad and the source pad such that the gate pad and the source pad are spaced apart from the edge of the cut edge of the first panel in a horizontal direction by a distance D.

Other features, elements and advantages of the present invention will be described in detail below with reference to preferred embodiments of the present invention and the attached drawings.

BRIEF DESCRIPTION OF THE ATTACHED DRAWINGS

The present invention will become more fully understood from the detailed description given herein below and the accompanying drawings which are given by way of illustration only, and thus do not limit the present invention and wherein.

Figure 1:
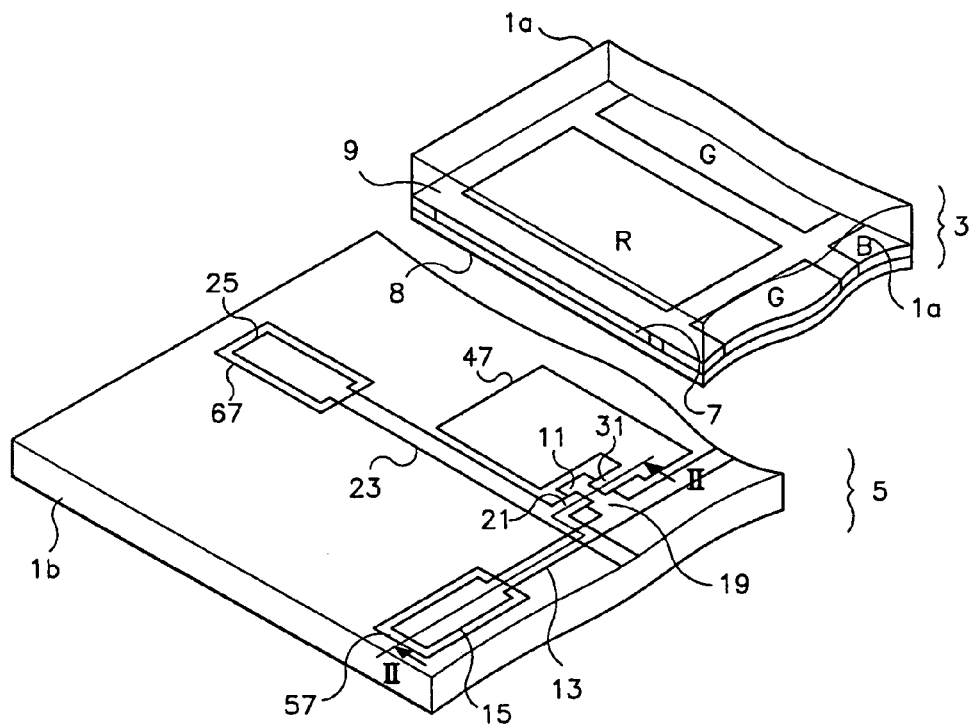
FIG. 1 is a perspective view of a conventional liquid crystal display device.
Figure 2:
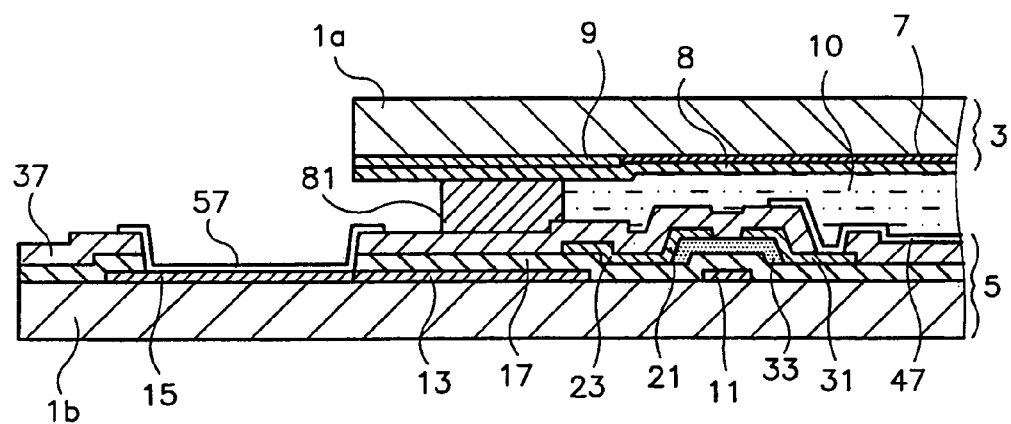
FIG. 2 is a cross-sectional plane view of the conventional liquid crystal display device cut along line II—II in FIG. 1.
Figure 3:
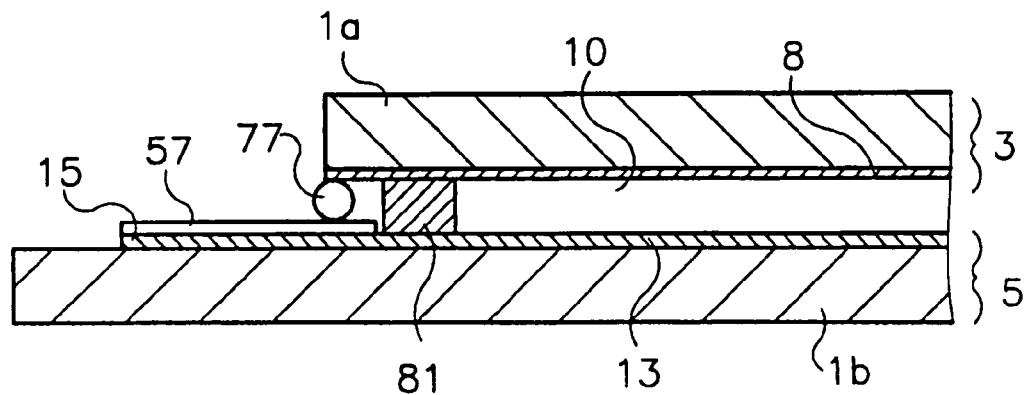
FIG. 3 is a cross sectional view illustrating how the pad is shorted to the common electrode by a conductive remainder in the conventional LCD.
Figure 4:
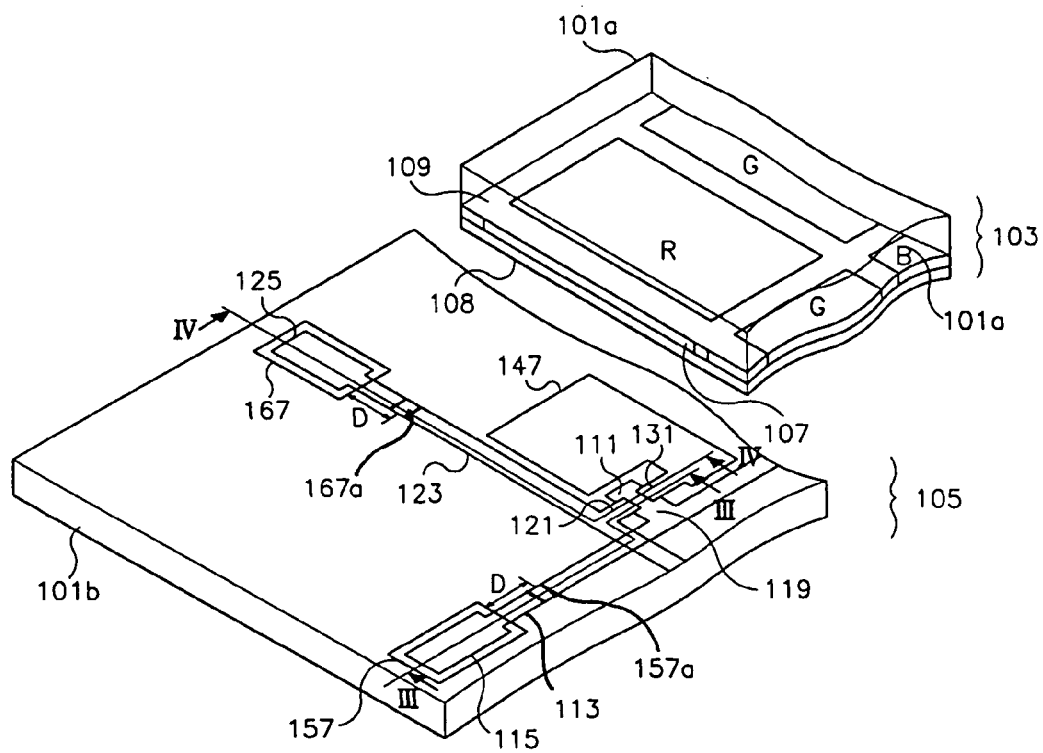
FIG. 4 is a perspective view of an LCD device according to a preferred embodiment of the present invention.
Figure 7:
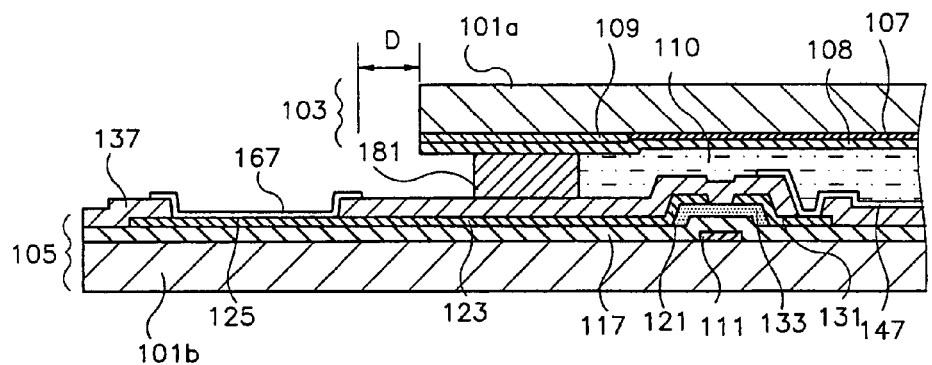
Figure 8:
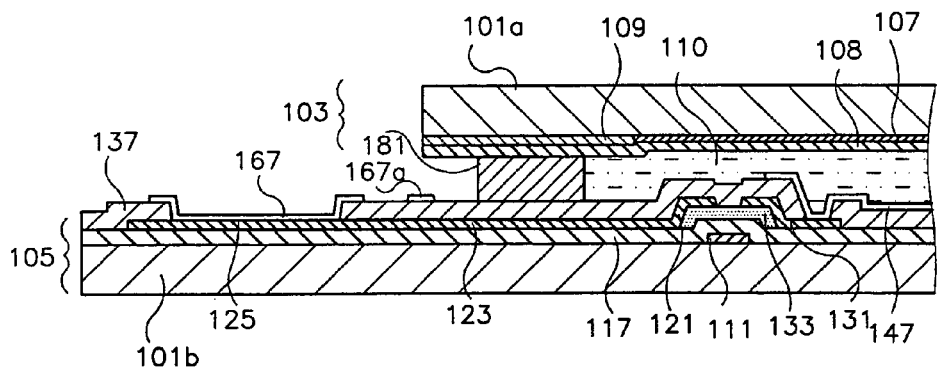

FIG. 7 is a cross-sectional view of an LCD device according to another preferred embodiment of the present invention cut along line IV—IV in FIG. 4; and FIG. 8 is a cross-sectional view of an LCD device according to another preferred embodiment of the present invention cut along line IV—IV in FIG. 4 in which a cut protection member made of ITO is provided on the passivation layer for protecting the passivation layer during a cutting process of the LCD.

DETAILED DESCRIPTION OF PREFERRED EMBODIMENTS

FIG. 4 is a perspective view of an LCD device according to a preferred embodiment of the present invention. Referring to FIG. 4, an LCD in accordance with the present invention includes an upper panel 103 and a lower panel 105. The upper panel, a color filter panel 103, includes a common electrode 108. The common electrode 108 extends along an entire horizontal surface of the upper panel 103 and is made of a transparent conductive material such as ITO.

The lower panel, an active panel 105, is connected to the upper panel 103 and spaced from the upper panel 103. The lower panel 105 includes a gate pad portion and a source pad portion. The gate pad portion includes a gate pad 115 made of metal and a gate pad terminal 157 made of transparent conductive material. Also, the source pad portion includes a source pad 125 made of metal and a source pad terminal 167 made of transparent conductive material.

A pad structure according to this preferred embodiment is spaced apart from an edge of the upper panel 103 in a horizontal direction by a distance 'D', as shown in FIG. 4. That is, in order to prevent a short between panels, the gate pad 115 and the source pad 125 of the lower panel 105 extend in the horizontal direction along a surface of the upper panel 103 and are spaced from the common electrode 108 in horizontal direction such that the gate and source pads 115 and 125 do not overlap with the common electrode 108. Also, the gate pad terminal 157 and the source pad terminal 167 extend in the horizontal direction along a surface of the upper panel 103 and are spaced apart from the common electrode 108 in the horizontal direction, for preventing a short between panels.

Referring now to FIGS. 5a to 5d and FIG. 7, which are cross-sectional views showing a method for manufacturing an LCD panel according to the present invention, a preferred embodiment of the present invention will be explained in detail.

Figure 5A:
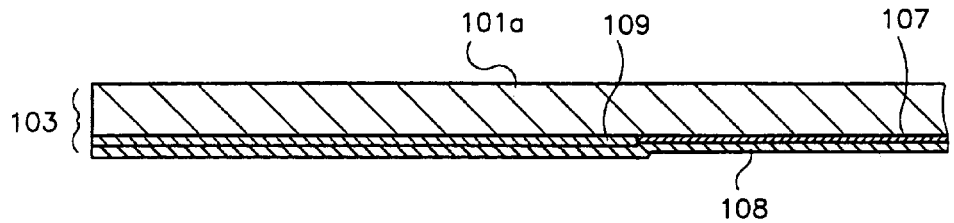
FIGS. 5a–5d show cross sectional views illustrating a manufacturing process for a liquid crystal display device according to preferred embodiments of the present invention.

On a first transparent glass substrate 101a, a plurality of color filters 107 are provided at positions which correspond to locations of each of a plurality of pixels which are arranged in a matrix pattern on a second transparent glass substrate 101b. The color filters 107 include red, green and blue resins. A black matrix 109 is disposed between each of the color filters 107. A common electrode 108 is formed by depositing an ITO (Indium Tin Oxide) on the whole surface of the substrate 101a having the color filter 107 and the black matrix 109. As a result, a color filter panel 103 is completed, as shown in FIG. 5a.

Figure 5B:
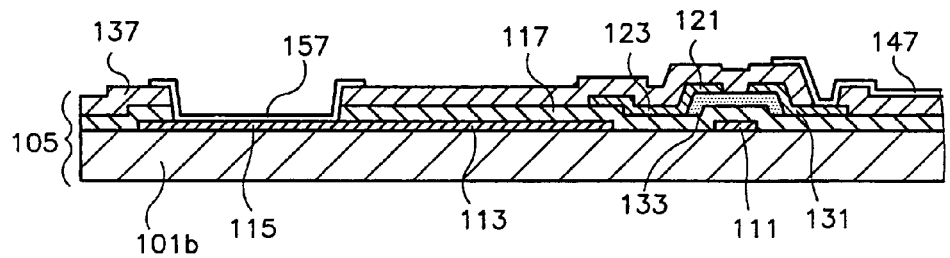

On a second transparent glass substrate 101b, a thin film transistor having a gate electrode 111, a semiconductor layer 133, a source electrode 121 and a drain electrode 131 is provided at one corner of the pixel. A pixel electrode 147 which is connected to the drain electrode 131 is disposed at the pixel and is aligned with the color filter 107. A gate bus line 113 connected to the gate electrode 111 and a source bus line 123 connected to the source electrode 121 are arranged in a lattice. At each end portion of the gate bus line 113 and the source bus line 123, a gate pad 115 and a source pad 125 are provided, respectively. The gate electrode 111, the gate bus line 113 and the gate pad 115 are covered by a gate insulating layer 117. The source electrode 121, the source bus line 123 and the drain electrode 131 are covered by a passivation layer 137. A portion of the gate pad 115 is exposed by patterning the passivation layer 137 and the gate insulating layer, and then a gate pad terminal 157 is formed on the exposed gate pad 115 by depositing a transparent conductive film such as ITO. Therefore an active panel 105 is completed, as shown in FIG. 5b. Each of the pads 115 and 125 and each of the pad terminals 157 and 167 are disposed at the edge portion of the active panel 105.

Figure 5C:
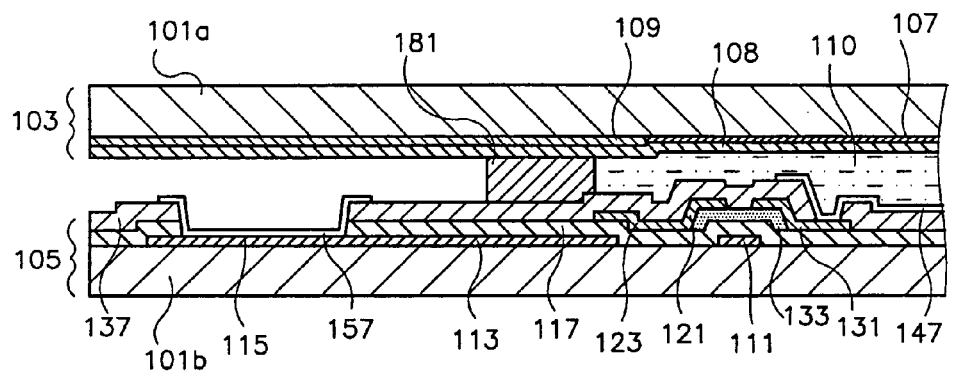

Using a sealant 181, the color filter panel 103 and the active panel 105 are joined together so as to be spaced from each other by a certain distance. A liquid crystal material 110 is injected into the space between the connected color filter panel 103 and the active panel 105, as shown in FIG. 5c.

Figure 5D:
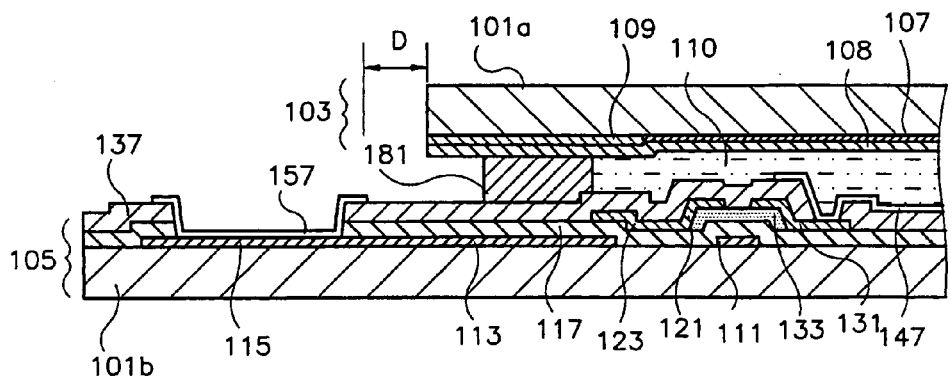

After a portion of the color filter panel 103 covering the pads 115, 125 and the pad terminals 157, 167 is removed by mechanical cutting, the pad terminals 157 and 167 are fully exposed. After this cutting process, the gate and source pads 115, 125 and the gate and source pad terminals 157, 167 are separated from the cut edge of the color filter panel 103 in a horizontal direction by a distance D, as shown in FIG. 5d and FIG. 7.

Figure 6:
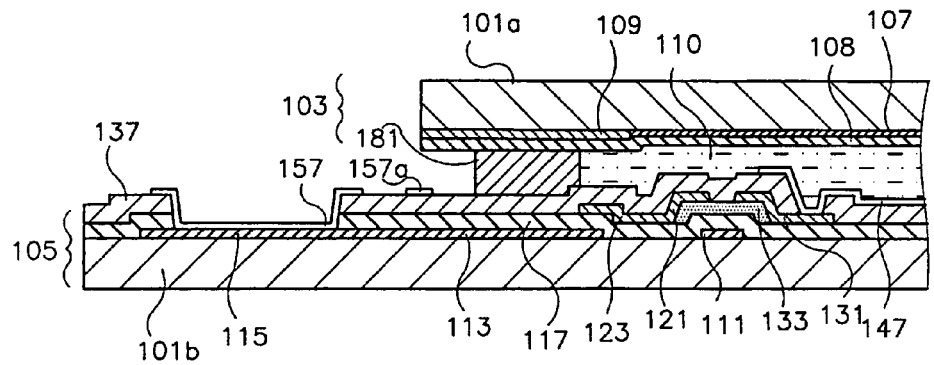
FIG. 6 is a cross-sectional view of an LCD device according to another preferred embodiment of the present invention cut along line III—III in FIG. 4.

Referring now to FIG. 6 and FIG. 8, another preferred embodiment of the present invention will be described.

A pad structure an accordance with this preferred embodiment includes cut protection members 157a and 167a made of ITO and provided on the passivation layer 137. The cut protection members 157a and 167a are not electrically connected to the pad terminals 115 and 125, respectively, and are overlapped in the horizontal direction with the common electrode 108, for protecting the passivation layer 137 and the active panel 105 from a cutting blade during the cutting process of the upper panel 103, as shown in FIGS. 6 and 8.

The present invention relates to a pad structure of an LCD in which a common electrode is arranged on an entire surface of a substrate and a method of manufacturing thereof. According to preferred embodiments the present invention, pads disposed on an active panel are spaced apart from the edge of a color filter panel by a desired distance. Therefore, the gate pad and the source pad are not overlapped and/or covered by the common electrode formed at the color filter panel. So, there is no electrical shorting between the pads and the common electrode caused by a conductive material such as a remaining portion of ITO material which is left behind after cutting the color filter panel to expose the pads.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display comprising:
    a first panel including a common electrode extending in a horizontal direction along a surface of the first panel and having an outer edge running substantially perpendicular to the horizontal direction; and
    a second panel coupled to the first panel and spaced from the first panel, the second panel including a pad having an edge facing the substantially perpendicular first panel outer edge, the pad extending in the horizontal direction along a surface of the second panel, the facing edge of the pad being spaced apart from the substantially perpendicular edge of the first panel in the horizontal direction by a desired distance.

2. The liquid crystal display according to claim 1, wherein the pad is a gate pad.

3. The liquid crystal display according to claim 1, wherein the pad is a source pad.

4. The liquid crystal display according to claim 1, wherein the common electrode extends along an entire horizontal surface of the first panel.

5. The liquid crystal display according to claim 1, wherein the pad is spaced from an edge of the first panel in the horizontal direction, wherein the edge of the first panel is the edge of first panel that is located closest to the pad.

6. The liquid crystal display according to claim 1, wherein said common electrode is made of Indium Tin Oxide.

7. The liquid crystal display according to claim 1, further comprising a passivation layer on the second panel and a cut protection member is provided on the second panel for protecting the passivation layer during a cutting process of the LCD.

8. The liquid crystal display according to claim 7, wherein the cut protection member is made of Indium Tin Oxide.

9. The liquid crystal display according to claim 1, wherein the pad is a gate pad, the liquid crystal display further comprising a gate bus line connected to the gate pad, a source pad, a source bus line connected to the source pad, a thin film transistor having a gate electrode extending from the gate bus line, a source electrode extending from the source bus line, a drain electrode facing the source electrode and a pixel electrode connected to the drain electrode.

10. The liquid crystal display according to claim 1, wherein the pad is a source pad, the liquid crystal display further comprising a gate pad, a gate bus line connected to the gate pad, a source bus line connected to the source pad, a thin film transistor having a gate electrode extending from the gate bus line, a source electrode extending from the source bus line, a drain electrode facing the source electrode and a pixel electrode connected to the drain electrode.

11. A liquid crystal display comprising:
    a first panel including a common electrode extending in a horizontal direction along a surface of the first panel and having an outer edge running substantially perpendicular to the horizontal direction; and
    a second panel coupled to the first panel and spaced from the first panel, the second panel including a pad terminal having an edge facing the substantially perpendicular first panel outer edge, the pad terminal extending in the horizontal direction along a surface of the second panel, the facing edge of the pad terminal being spaced apart from the substantially perpendicular edge of the first panel in the horizontal direction by a desired distance.

12. The liquid crystal display according to claim 11, wherein the pad terminal is a gate pad terminal.

13. The liquid crystal display according to claim 11, wherein the pad terminal is a source pad terminal.

14. The liquid crystal display according to claim 11, wherein the common electrode extends along an entire horizontal surface of the first panel.

15. The liquid crystal display according to claim 11, wherein the pad terminal is spaced from an edge of the first panel in the horizontal direction, wherein the edge of the first panel is the edge of the first panel that is located closest to the pad terminal.

16. The liquid crystal display according to claim 11, wherein said common electrode and said pad terminal are made of Indium Tin Oxide.

17. The liquid crystal display according to claim 11, further comprising a passivation layer on the second panel and a cut protection member is provided on the second panel for protecting the passivation layer during a cutting process of the LCD.

18. The liquid crystal display according to claim 17, wherein the cut protection member is made of Indium Tin Oxide.

19. The liquid display according to claim 11, wherein the pad is a gate pad, the liquid crystal display further comprising a gate bus line connected to the gate pad, a source pad, a source bus line connected to the source pad, a thin film transistor having a gate electrode extending from the gate bus line, a source electrode extending from the source bus line, a drain electrode facing the source electrode and a pixel electrode connected to the drain electrode.

20. The liquid display according to claim 11, wherein the pad is a source pad, the liquid crystal display further comprising a gate pad, a gate bus line connected to the gate pad, a source bus line connected to the source pad, a thin film transistor having a gate electrode extending from the gate bus line, a source electrode extending from the source bus line, a drain electrode facing the source electrode and a pixel electrode connected to the drain electrode.

21. A liquid crystal display comprising:
   a first panel including a first ITO layer extending in a horizontal direction along a surface of the first panel and having an outer edge running substantially perpendicular to the horizontal direction; and
   a second panel coupled to the first panel and spaced from the first panel, the second panel including a second ITO layer having an edge facing the substantially perpendicular first panel outer edge, the second ITO layer extending in the horizontal direction along a surface of the second panel, the facing edge of the second ITO layer being spaced apart from the substantially perpendicular first panel outer edge in the horizontal direction by a desired distance.

22. The liquid crystal display according to claim 21, wherein the first ITO layer is a common electrode and the second ITO layer is a pad terminal.

23. The liquid crystal display according to claim 22, wherein the pad terminal is a gate pad terminal.

24. The liquid crystal display according to claim 22, wherein the pad terminal is a source pad terminal.

25. The liquid display according to claim 22, wherein the common electrode extends along an entire horizontal surface of the first panel.

26. The liquid crystal display according to claim 22, wherein the second ITO layer is spaced from an edge of the first panel in the horizontal direction, wherein the edge of the first panel is the edge of the first panel that is located closest to the second ITO layer.

27. The liquid crystal display according to claim 22, further comprising a passivation layer on the second panel and a cut protection member is provided on the second panel for protecting the passivation layer during a cutting process of the LCD.

28. The liquid crystal display according to claim 27, wherein the cut protection member is made of Indium Tin Oxide.

29. The liquid crystal display according to claim 21, further comprising a gate pad, a gate bus line connected to the gate pad, a source pad, a source bus line connected to the source pad, a thin film transistor having a gate electrode extending from the gate bus line, a source electrode extending from the source bus line, a drain electrode facing the source electrode and a pixel electrode connected to the drain electrode.

30. The liquid crystal display according to claim 29, further comprising a gate pad, a gate bus line connected to the gate pad, a source pad, a source bus line connected to the source pad, a thin film transistor having a gate electrode extending from the gate bus line, a source electrode extending from the source bus line, a drain electrode facing the source electrode and a pixel electrode connected to the drain electrode.

31. A method for manufacturing a liquid crystal display comprising steps of:
   forming a first panel including a common electrode;
   forming a second panel including a pad;
   joining the first panel and the second panel together such that the first panel is spaced from the second panel;
   inserting a liquid crystal between the first panel and the second panel; and
   cutting a portion of the first panel covering the pad in order to expose the pad so that the pad does not overlap with the common electrode.

32. The method according to claim 31, wherein the common electrode is formed along an entire horizontal surface of the first panel.

33. The method according to claim 31, wherein the pad is a gate pad.

34. The method according to claim 31, wherein the pad is a source pad.

35. The method according to claim 31, further comprising the step of forming a cut protection member on the second panel for protecting the liquid crystal display during the cutting step.

36. The method of claim 31, wherein after the cutting step, the pad is spaced apart from an edge of the first panel in a horizontal direction, the edge of the first panel being an edge of the first panel that is located closest to the pad.

37. The method according to claim 31, wherein the pad is a gate pad, the method further comprising the steps of forming a gate bus line connected to the gate pad, forming a source pad, forming a source bus line connected to the source pad, forming a thin film transistor having a gate electrode extending from the gate bus line, forming a source electrode extending from the source bus line, forming a drain electrode facing the source electrode and forming a pixel electrode connected to the drain electrode.

38. The method according to claim 31, wherein the pad is a source pad, the method further comprising the steps of forming a gate pad, forming a gate bus line connected to the gate pad, forming a source bus line connected to the source pad, forming a thin film transistor having a gate electrode extending from the gate bus line, forming a source electrode extending from the source bus line, forming a drain electrode facing the surface electrode and forming a pixel electrode connected to the drain electrode.

39. A method for manufacturing a liquid crystal display comprising steps of:
   forming a first panel including a common electrode;
   forming a second panel including a pad terminal;
   joining the first panel and the second panel together such that the first panel is spaced from the second panel;
   inserting a liquid crystal between the first panel and the second panel; and cutting a portion of the first panel covering the pad terminal in order to expose the pad terminal so that the pad terminal does not overlap with the common electrodes.

40. The method according to claim 39, wherein the common electrode is formed along an entire horizontal surface of the first panel.

41. The method according to claim 39, wherein the pad terminal is a gate pad terminal.

42. The method according to claim 39, wherein the pad terminal is a source pad terminal.

43. The method according to claim 39, further comprising the step of forming a cut protection member on the second panel for protecting the liquid crystal display during the cutting step.

44. The method of claim 39, wherein after the cutting step, the pad terminal is spaced apart from an edge of the first panel in a horizontal direction, the edge of the first panel being the edge of the first panel that is located closest to the pad terminal.

45. A method for manufacturing a liquid crystal display comprising steps of:
    forming a first ITO layer on a first panel;
    forming a second ITO layer on a second panel;
    joining the first panel and the second panel together such that the first panel is spaced from the second panel;
    inserting a liquid crystal between the first panel and the second panel; and
    cutting a portion of the first panel covering the second ITO layer on the second panel so that the first and second ITO layers do not overlap with each other.

46. The method according to claim 45, wherein the first ITO layer defines a common electrode.

47. The method according to claim 46, wherein the common electrode is formed along an entire horizontal surface of the first panel.

48. The method according to claim 45, wherein the second ITO layer defines a gate pad terminal.

49. The method according to claim 45, wherein the second ITO layer defines a source pad terminal.

50. The method according to claim 45, further comprising the step of forming a cut protection member on the second panel for protecting the liquid crystal display during the cutting step.

51. The method according to claim 50, wherein the cut protection member is formed on the second ITO layer on the second panel.

52. The method of claim 45, wherein after the cutting step, the second ITO layer is spaced apart from an edge of the first panel in a horizontal direction, the edge of the first panel being the edge of the first panel that is located closest to the second ITO layer.

* * * * *